United States Patent [19]

Onfroy

[11] Patent Number: 4,948,551

[45] Date of Patent: Aug. 14, 1990

[54] METHOD OF PROTECTING A PRESSURIZED WATER NUCLEAR REACTOR AGAINST FAILURES IN ITS EMERGENCY STOP MEANS

[75] Inventor: Olivier Onfroy, Bourg la Reine, France

[73] Assignee: Framatome, Courbevoie, France

[21] Appl. No.: 235,598

[22] Filed: Aug. 24, 1988

[30] Foreign Application Priority Data

Aug. 24, 1987 [FR] France ................. 87 11848

[51] Int. Cl.⁵ .............................................. G21C 7/36
[52] U.S. Cl. ..................................... 376/216; 376/244
[58] Field of Search ............... 376/216, 217, 218, 241, 376/244, 278

[56] References Cited

U.S. PATENT DOCUMENTS

| | | | |
|---|---|---|---|
| 2,920,025 | 1/1960 | Anderson | 376/216 |
| 3,929,513 | 11/1975 | Loose | 376/216 |
| 4,222,822 | 9/1980 | Mueller | 376/216 |
| 4,292,128 | 9/1981 | Takeda | 376/216 |
| 4,836,973 | 6/1989 | Foret | 376/216 |

FOREIGN PATENT DOCUMENTS 0185455 6/1986 European Pat. Off.
2349922 11/1977 France.

Primary Examiner—Donald P. Walsh
Attorney, Agent, or Firm—Pollock, Vande Sande & Priddy

[57] ABSTRACT

In the event of an incident in the secondary cooling circuit of a nuclear reactor preventing cooling the water in the primary circuit of the steam generators (2) which are common to both circuits, an emergency stop instruction is issued in order to cause control and stop rods to fall into the core of the reactor. If this instruction is not executed, and if the reactor remains at a high power level, an instruction is issued to stop the primary pumps. A rapid increase in the temperature of the water in the core then slows down the nuclear reaction soon enough to prevent subsequent excess pressure from damaging the primary circuit. The invention is particularly applicable to electricity-generating nuclear power stations.

4 Claims, 3 Drawing Sheets

METHOD OF PROTECTING A PRESSURIZED WATER NUCLEAR REACTOR AGAINST FAILURES IN ITS EMERGENCY STOP MEANS

FIELD OF THE INVENTION

The present invention relates to the safety of pressurized water nuclear reactors, and more particularly to protecting such a reactor in the event that, following an incident, firstly the measured boiler parameters reach values which justify issuing an emergency stop instruction, and secondly said instruction is not executed. The incident in question could, in particular, be constituted by a loss of feed water to the steam generators.

BACKGROUND OF THE INVENTION

We begin by recalling the state of the art concerning reactors and provisions for their safety.

The nuclear boiler generally comprises a pressurized water reactor, one or more steam generators, and one or more primary water circulation pumps. Each of the steam generators associated with one or more pumps and with interconnecting pipework constitutes a primary loop.

A closed volume referred to as the "pressurizer" is connected to one of the primary loops and serves, in normal operation, to maintain the primary circuit at a substantially constant pressure, in particular during load transients. The pressure of the primary circuit is maintained either by opening valves for discharging steam or by injecting water by spraying, or else by heating the liquid portion of the pressurizer by means of electrical heater elements which are implanted for that purpose in the bottom thereof. These means are used either to lower or to raise the pressure, depending on boiler operation.

The secondary portions of the steam generators are fed with feed water which is transformed into steam by heat exchange with the water in the primary circuit. This steam then drives a turbine which is mechanically associated with an alternator, thereby feeding an electricity distribution grid.

In the event of a loss of feed water, protection systems issue a reactor emergency stop instruction. This instruction consists in switching off the electricity fed to the devices for holding clusters of control rods. These rods then move fully into the core of the reactor together with the so-called "stop" clusters which are fully extracted in normal operation.

Although it is improbable, account must be taken of the possibility of a reactor emergency stop instruction being issued but not executed, following an abnormal operating transient. This event is known in the art as "an emergency stop failure during a transient". In the event of a loss of feed water flow at the inlet to a steam generator, it is essential to proceed with an emergency stop. However, if the emergency stop does not occur in spite of the instruction which is issued under such circumstances, then the primary circuit is no longer properly cooled. In this case, the temperature of the primary circuit and consequently the pressure of said circuit increase considerably. The pressure may exceed not only the set pressure of the safety valves, but also the test pressure of the primary circuit, even with the safety valves fully open. There is thus a major risk of the primary circuit breaking, i.e., of losing the integrity of one of the three confinement barriers, with the first barrier being the sheath in which the fuel is contained, the second barrier being the primary circuit, and the third barrier being the reactor confinement enclosure.

Various arrangements have been devised to avoid this possibility of primary circuit rupture.

According to French Patent Application No. 2,349,922, auxiliary means issue instructions for inserting certain groups of clusters of rods in the event that the feed water pumps stop, thereby reducing the power of the reactor without having to issue an emergency stop instruction, and thus retaining the possibility of subsequently raising the reactor power as quickly as possible after the feed water pumps have restarted.

According to European Patent No. 0 185 455, means independent of the protection system issue an instruction which is complementary thereto, in the event that the feed water flow rate becomes less than a predetermined threshold value. As a result, if the emergency stop instruction is not issued for some reason, the independent means issue instructions for inserting control rods so as to limit neutron power and thus avoid excess pressure in the primary circuit.

In the French application, the method described serves to reduce reactor power in the event of an incident, thereby avoiding the drawbacks of probable excess pressure and also enabling a rapid return to the desired power level.

In the European application, the method described assumes that emergency stop conditions obtained but that the instruction for the emergency stop is not issued by the protection means. No mention is made of the case in which the instruction is indeed issued by said means, but that the issued instruction is without effect.

In order to avoid excess pressure, proposals have been made elsewhere to greatly increase the discharge capacity of the valves installed on the primary circuit or to increase the capacity of the emergency feed water system.

The drying-out of the steam generators can also be slowed down by stopping the turbine, by partially closing the steam by-pass circuit, and by closing the steam generator purge valves.

These known arrangements give rise to considerable extra cost in boiler construction.

Incidents other than the loss of feed water may require an emergency stop and become dangerous if the corresponding emergency stop instruction is not issued or is not executed. Such a loss and such other incidents therefore constitute incidents of a dangerous kind.

SUMMARY OF THE INVENTION

An object of the present invention, in the event of an incident of the above-described dangerous kind, is to maintain the integrity of the confinement barriers and simultaneously to avoid excessive over-dimensioning of the safety circuits, and in particular of the safety valves and of the emergency feed water system for the steam generators.

To this end, the present invention provides a method of protecting a pressurized water nuclear reactor against failures of its emergency stop means, the reactor to be protected comprising:

a core in which a nuclear reaction is taking place;
control and/or stop rods suitable for penetrating into said core;
emergency stops means for responding to an emergency stop instruction by causing said rods to penetrate into said core in order to stop said reaction; and a primary cooling circuit for cooling said core by the primary water driven under pressure by means of at least one primary pump;

The method includes the following operations:

detecting a possible incident of a dangerous kind which initially leaves said primary cooling circuit of the reactor intact but which runs the risk, after a delay has elapsed, of causing the temperature and the pressure in said circuit to rise to dangerous values which may damage it;

generating said emergency stop instruction in the event of such an incident being detected;

monitoring execution of said emergency stop signal and generating an emergency stop means failure signal if said instruction is not executed; and stopping the primary pump in response to said failure signal, in such manner that a rapid and limited rise in the temperature of the water in said core slows down said nuclear reaction soon enough to avoid said temperature reading a dangerous value after said delay has elapsed.

The invention more particularly, but not exclusively, provides such a method which is applicable to a reactor further including at least one steam generator which has said primary water passing therethrough and which also receives feed water from a secondary circuit to cool said primary water;

The method also includes monitoring the flow rate of said feed water, and detecting an incident of a dangerous kind in the event that a dangerous reduction in said flow rate is detected.

The method in accordance with the invention makes it possible to reduce the nuclear power of the reactor very quickly by making use of a known moderator effect which results from heating the primary water. It has been found that this effect is suitable for giving rise fast enough to a slowdown in the nuclear reaction, and thus in the reactor power, prior to the steam generators completely drying out. To obtain this result, said heating in the core of the reactor must take place fast enough, and this is obtained by stopping the circulation of the primary water.

Preferably, said primary pump is stopped when said dangerous reduction in the feed water flow rate has given rise to the appearance of said emergency stop instruction, a predetermined length of time has elapsed since said instruction appeared, and simultaneously said failure signal is present, said signal representing the fact that the power of said nuclear reactor is greater than a predetermined threshold after said predetermined time has elapsed.

BRIEF DESCRIPTION OF THE DRAWINGS

An embodiment of the invention will now be described by way of example with reference to the accompanying drawings, in which.

DETAILED DESCRIPTION

Figure 1:
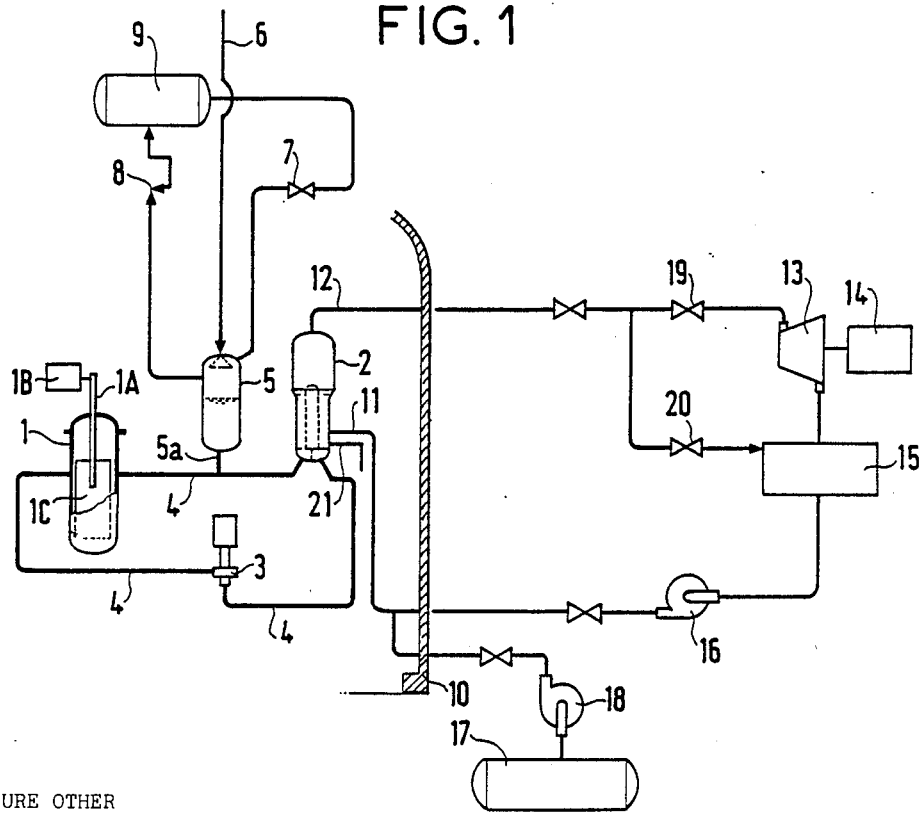
FIG. 1 is a schematic diagram of a nuclear power station.

FIG. 1 is a simplified diagram of a nuclear power station comprising two major portions: the steam-producing boiler and the so-called "conventional" portion.

The boiler includes the reactor which comprises a core 1C, control rods and stop rods 1A and emergency stop means 1B for causing said rods to fall into the core. The reactor is associated with one or more loops each comprising a steam generator 2, a primary fluid (water) circulation pump 3, and associated pipework 4. The pressurizer 5 is connected to one of the loops. In order to facilitate understanding, only one loop is shown in FIG. 1, namely, the loop having the pressurizer installed thereon.

The main function of the pressurizer is to maintain the operating pressure in the primary circuit. This pressure is maintained either by injecting water by spraying it into the pressurizer via a line 6, or by opening discharge valves 7 in order to prevent the pressure from rising, or else by heating a portion of the liquid contained in the pressurizer using electrical heater resistances placed at the bottom 5A thereof in order to prevent the pressure from dropping. Safety valves 8 are installed on the pressurizer. The primary fluid leaving the discharge valves 7 and the safety valves 8 is collected in a discharge tank 9. All of the boiler components mentioned above are grouped together in a confinement enclosure 10.

The conventional portion is situated for the most part outside the confinement enclosure. The feed water inlet 11 to the steam generators and the steam outlet 12 therefrom are connected to the outside via passages or feedthroughs extending through said sealed confinement enclosure.

The conventional portion comprises a steam turbine 13 which is connected to an alternator 14 feeding the electricity grid. On leaving the turbine 13, the steam passes through a condenser 15. The feed water recovered at the outlet of the condenser is reinjected at the inlet 11 to the steam generator by a pump 16. An emergency feed water tank 17 is provided for injecting water into the steam generator via a pump 18. This emergency feed water is injected into the steam generator if a low feed water flow rate signal is present simultaneously with the power of the reactor being greater than a value which may be set, for example, to about 30% of nominal power.

This emergency feed water is essentially utilized for continuing heat exchange in the steam generator and thereby continuing to extract heat from the primary circuit of the reactor.

In the event of the feed water flow rate dropping below a predetermined threshold value, various actions are undertaken such as: stopping the turbine, beginning the injection of emergency feed water as mentioned above, partially opening the steam circuit by-passing the turbine, stopping the purges in the steam generators, and tripping the reactor emergency stop instruction.

The turbine is stopped by closing its admission valve 19, and the steam is allowed to by-pass it by opening valve 20. In order to simplify understanding, only one of each of these valves is shown in FIG. 1.

The steam generators are purged via tubes 21 in the secondary portions of the generators. The purpose of these tubes is to bleed off water so that the composition of the feed water can be monitored, and also to verify that there is no direct connection between the primary and secondary circuits.

The reactor emergency stop instruction should normally have the effect of causing all of the control rods to drop and become fully inserted.

Safety authorities, and in particular the American Nuclear Society, have defined types of incident which may happen during an operating transient. One of these incidents is the loss of feed water in a steam generator without a succeeding emergency stop. In this event, the most difficult configuration occurs when the set of control clusters has not been fully inserted for electrical reasons (assuming the emergency stop switch has not responded to the received instruction) or mechanical reasons (assuming an obstacle of some kind is preventing the control and stop clusters from falling).

Reference will now be made to FIG. 2 for understanding the phenomena which occur in the boiler in the event of an interruption in feed water supply without the emergency stop instruction being executed. As explained, when there is an interruption in feed water, the generator-driving turbine is stopped by closing its admission valve.

Figure 2A:
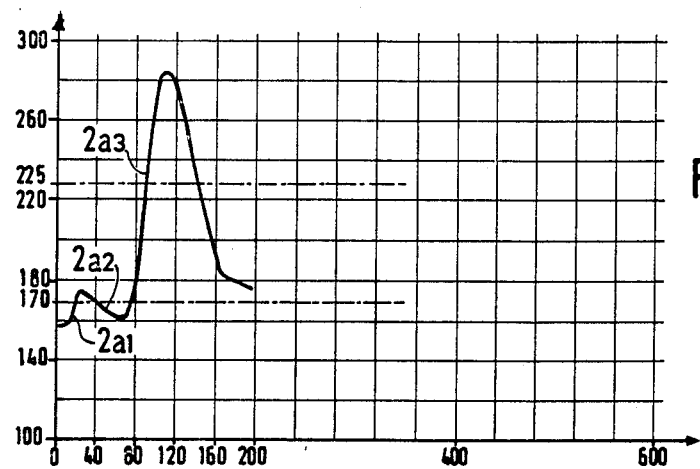
FIGS. 2A, 2B, and 2C are curves showing pressure, nuclear power, and power extracted from the steam generator, respectively, as a function of time when using prior methods.
Figure 2B:
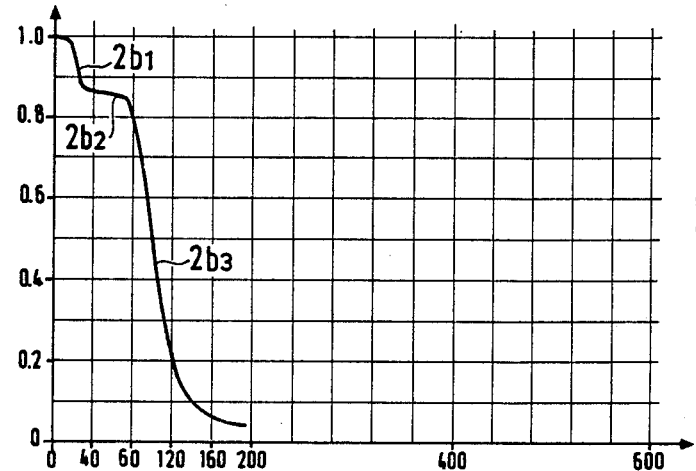
Figure 2C:
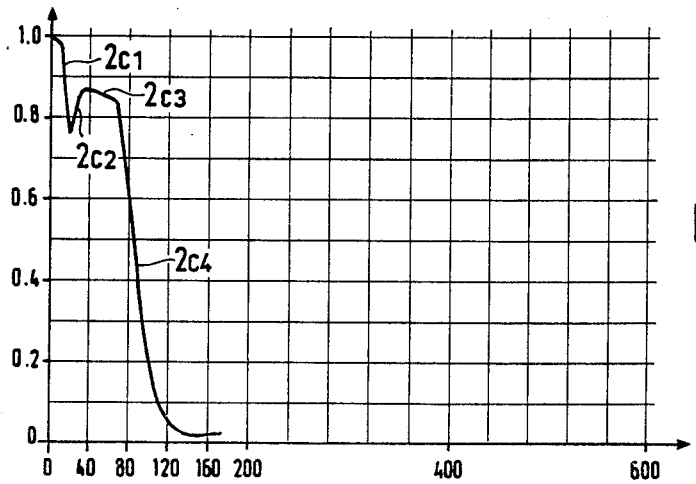

As a result, the steam flow rate leaving the steam generators drops suddenly for a period of about 20 seconds as indicated by curve portion $2c1$ in FIG. 2c. This drop in power extracted from the steam generator corresponds to an increase in temperature in the primary circuit of the reactor which is no longer cooled. It is well known that, in parallel with this temperature rise, there is an increase in pressure, which is shown in portion $2a1$ of the curve FIG. 2A.

The rise in the temperature of the water in the primary circuit gives rise to a moderator effect, i.e., to an effect which reduces reactivity, thereby reducing the nuclear power as measured in the core.

This reduction in nuclear power is shown by portion $2b1$ of the curve in FIG. 2B and corresponds to the first portion of the curves in FIGS. 2A and 2C.

The steam by-pass circuit to the condenser is opened partially about 20 seconds after opening. The power extracted from the steam generator increases slightly (curve portion $2c2$), thereby slightly reducing the temperature and pressure in the primary circuit (curve portion $2a2$).

Since the steam generator is no longer being fed with water, the power extracted therefrom begins very rapidly to fall off slowly (curve portion $2c3$) and then falls off very quickly (curve portion $2c4$) until the steam generators have dried out and before the emergency feed water means being brought into operation.

The temperature and pressure increase very quickly. The rapid increase in temperature has the effect of reducing the nuclear power at the same speed so as to bring it to a value close to its minimum value (curve portion $2b3$). Unfortunately, the increase in temperature is accompanied by an equally rapid increase in pressure (curve portion $2a3$). This pressure very quickly exceeds not only the pressure at which the safety valves are set to open (and is fixed at about 170 bars), but also exceeds the value of 255 bars above which the primary circuit is very likely damaged, and which may rise to a value close to 285 bars.

It is clear that this situation is dangerous for the integrity of the primary circuit.

The curves of FIG. 3 show the same variables under the same circumstances, except that the invention is applied.

Figure 3A:
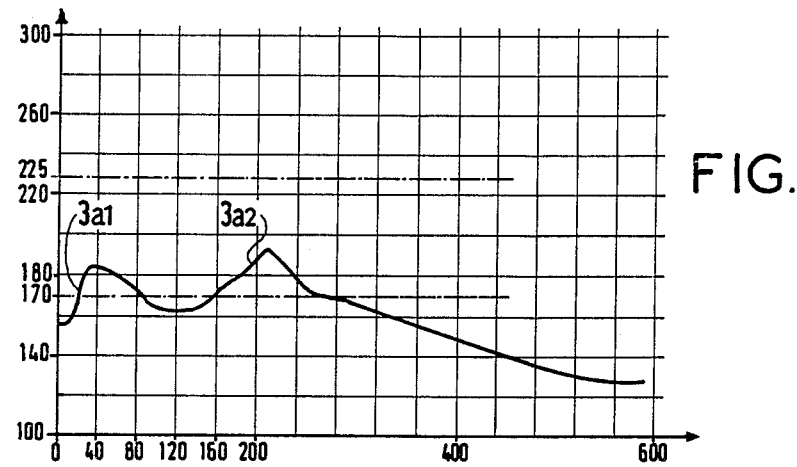
FIGS. 3A, 3B, and 3C are the corresponding curves of pressure, nuclear power, and power extracted from the steam generator when applying the method in accordance with the invention.
Figure 3B:
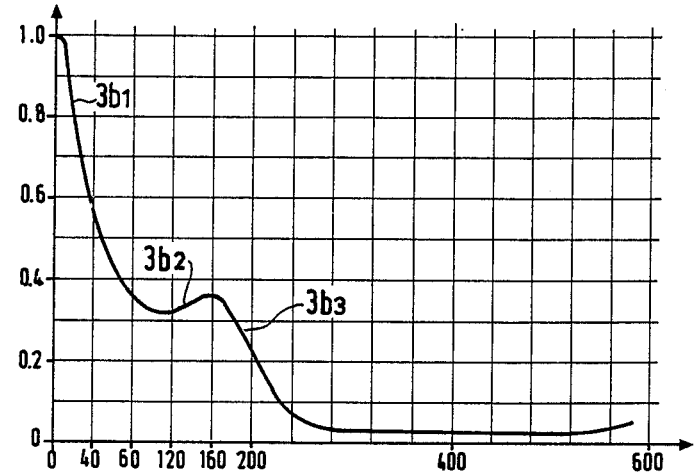
Figure 3C:
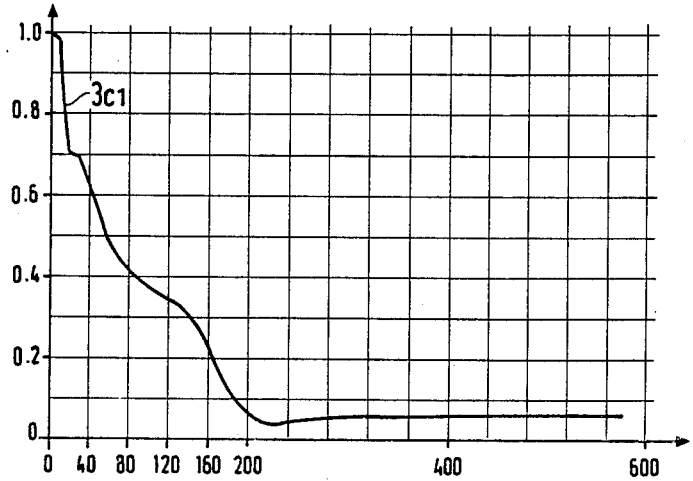

As soon as the feed water supply is interrupted, the power taken from the steam generator falls off rapidly (curve portion $3c1$). Its temperature therefore increases, and so does its pressure (curve portion $3a1$). In FIGS. 3A, 3B, and 3C, it can be seen that the values of the parameters under consideration vary fairly slowly for about 20 seconds and then more quickly thereafter. In accordance with the invention, as soon as it is observed that feed water supply has been lost while the reactor power is above a predetermined threshold, an instruction is issued to stop the circulation pumps 3 for circulating the primary fluid.

The effect of this stop instruction is not immediate. The inertia of the motor-pump units keeps them rotating for a certain length of time, but the speed at which they rotate falls off rapidly.

The combined effects of stopping the turbine and also stopping the pumps causes the extraction of heat from the steam generator to fall off more rapidly than in the prior art method.

The pressure increases significantly, and so does the temperature. The temperature increases even more quickly in the reactor since the primary fluid is not circulating. Curve portion $3b1$ shows a rapid fall in reactor power which does not include a levelling off when the by-pass circuit enabling steam to by-pass the turbine is partially opened about 20 seconds after the incident. The pressure thus rises to a first peak which is greater than the set pressure of the safety valves, and then falls without reaching the strength limit of the primary circuit.

After 120 seconds, the emergency feed water pump 18 starts, thereby slowing down the rate at which the power extracted from the steam generators 2 is dropping. As a result, the temperature in the primary circuit decreases, causing the nuclear power to rise slightly, whence an increase in temperature and pressure up to a value of 190 bars.

As the temperature rises, the moderator effect thereof causes the nuclear power to drop down to a value of close to 5%.

By comparing the curves of FIGS. 2 and 3, it can be seen that stopping the primary pumps as soon as a feed water defect is observed at time 0 gives rise to a drop in nuclear power (curve $3b$) which is much greater than before (curve $2b$). The second pressure peak $3a2$ which appears at the method in accordance with the invention begins at 160 seconds when the power of the core is about 35% of its nominal value (curve $3b$). By comparison, the second pressure peak in the prior art method begins at 80 seconds while the power of the core is close to 80%. It can clearly be seen that rapidly stopping the primary pumps make it possible to reduce the nuclear power more rapidly because of the moderator effect, thereby reducing the temperature and pressure in the primary circuit such that the maximum value of pressure actually reached is not dangerous for the integrity of the primary circuit.

In addition to stopping the primary pumps 3, boric acid is added to the primary circuit, thereby contributing to bringing the reactor to a safe state. Such addition of boric acid takes place in conventional manner via the circuits for monitoring volume and chemical composition which is normally provided for this purpose.

Figure 4:
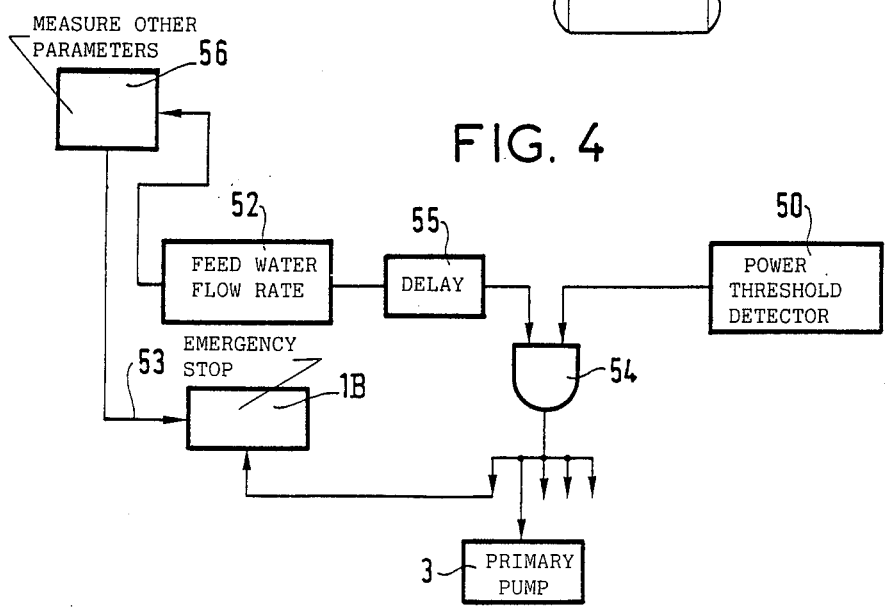
FIG. 4 is a schematic diagram of the means for stopping the primary pumps in the method in accordance with the invention.

The curves of FIGS. 2 and 3 correspond to the reactor power being at a value of 100% at the moment the incident occurs. Nevertheless, the invention is useful even at lower values of power. However, below a certain power threshold, the feed water flow rate is low and may reach a minimum threshold. The various protective actions mentioned above should then not be brought into operation. FIG. 4 is a block diagram of a device in accordance with the invention for preventing such actions being put into operation when unnecessary.

A system 50 measures the nuclear power of the reactor 1 and provides a signal having binary logic value 1 if the power is greater than a predetermined threshold (e.g., 30% of nominal power). A system 52 measures the so-called "normal" feed water flow rate as provided by the pump 16 and flowing through the steam generator 2. It contributes to generating a first emergency stop signal applied at 53 to the means 1B, and associated with other signals generated at 56 from other physical parameters. It provides a signal of binary logic value 1 via a delay circuit 55 if the flow rate is below the above-mentioned minimum threshold. These two signals are received by an AND gate 54 which, when both input signals thereto are at logic level 1, generates instructions for the following actions to be taken:

the primary pumps are stopped;
the emergency feed water pump 18 is started;
a portion (not shown) of the steam by-pass circuit including the valve 20 is closed;
the purges from the steam generators 2 are stopped; and
a redundant emergency stop instruction is issued to the means 1B.

I claim:

1. Method of protecting a pressurized water nuclear reactor against failures of its emergency stop means, the reactor to be protected comprising
    a core in which a nuclear reaction is taking place;
    control and/or stop rods adapted to penetrate into said core;
    emergency stops means for responding to an emergency stop instruction by causing said rods to penetrate into said core in order to stop said reaction; and
    a primary cooling circuit for cooling said core by primary water driven under pressure by means of at least one primary pump;
    said method including the steps of
        (a) detecting an incident which initially leaves said primary cooling circuit of said reactor intact but which, after a delay, causes temperature and pressure in said primary cooling circuit to rise to undesirable levels; and
        (b) generating said emergency stop instruction in the event of detection of said incident;
        (c) monitoring execution of said emergency stop instruction and generating an emergency stop means failure signal if said instruction is not executed; and
        (d) stopping said primary pump in response to said failure signal, in such manner that a rapid and limited rise in temperature of water in said core slows down said nuclear reaction soon enough to avoid said temperature from reaching an undesirable level after said delay has elapsed.

2. Method according to claim 1, said method being applicable to a reactor further including at least one steam generator which has said primary water passing therethrough and which also receives feed water from a secondary circuit to cool said primary water, said method including monitoring a flow rate of said feed water, and detecting a said incident in the event that a predetermined reduction in said flow rate is detected.

3. Method according to claim 2, wherein said primary pump is stopped when said predetermined reduction in said feed water flow rate has caused the appearance of said emergency stop instructions, a predetermined length of time has elapsed since said appearance of said instruction and said failure signal is simultaneously present, said signal representing the fact that the power of said nuclear reactor is greater than a predetermined threshold after said predetermined time has elapsed.

4. Method according to claim 3, wherein said stopping of said primary pump is accompanied by a redundant emergency stop instruction which causes said rods to penetrate into said core, thereby stopping said nuclear reaction.

* * * * *